Figure 3:
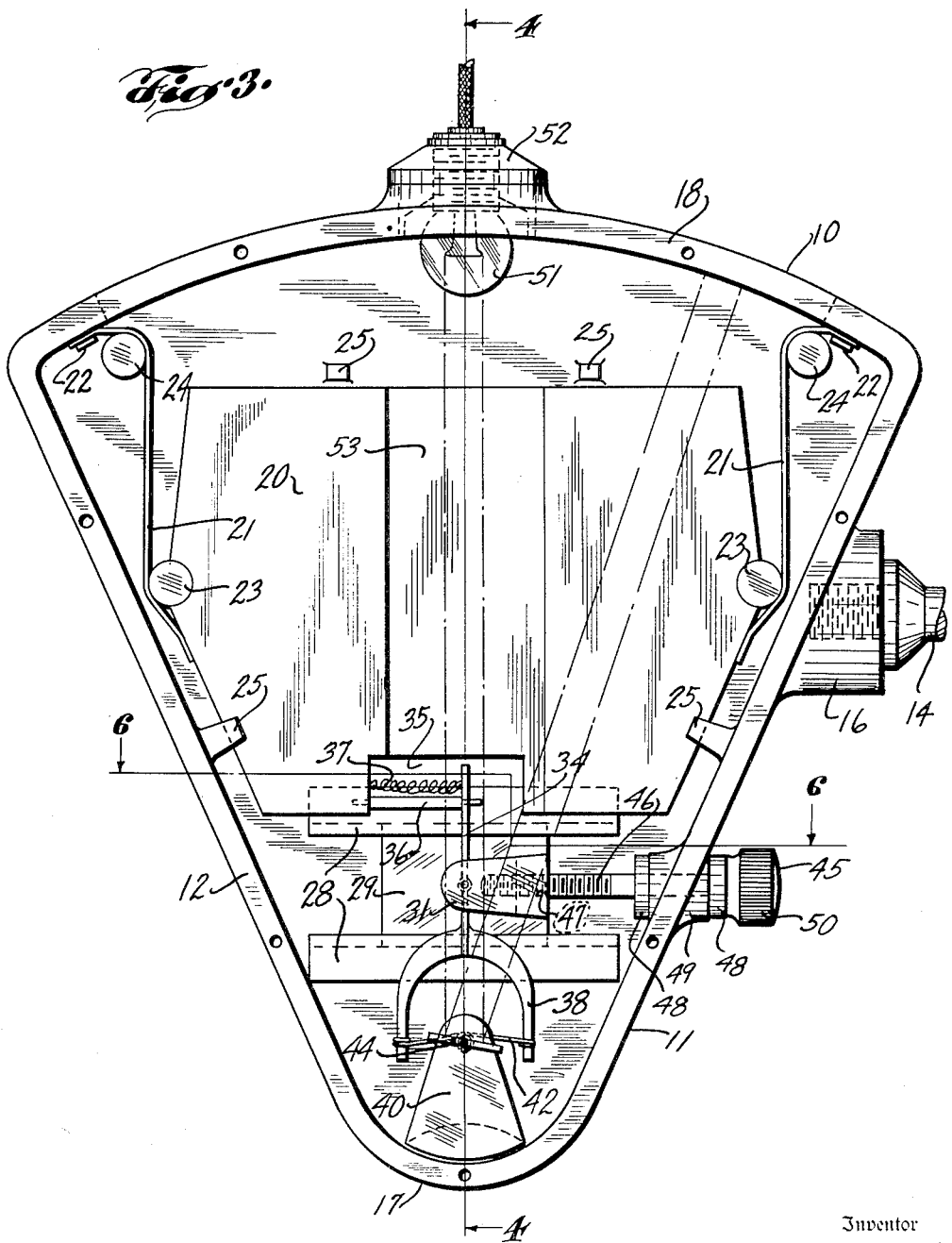

Dec. 8, 1936.  E. J. SCHNAITTER  2,063,127
VIBRATION INDICATOR
Filed April 25, 1932  3 Sheets-Sheet 1
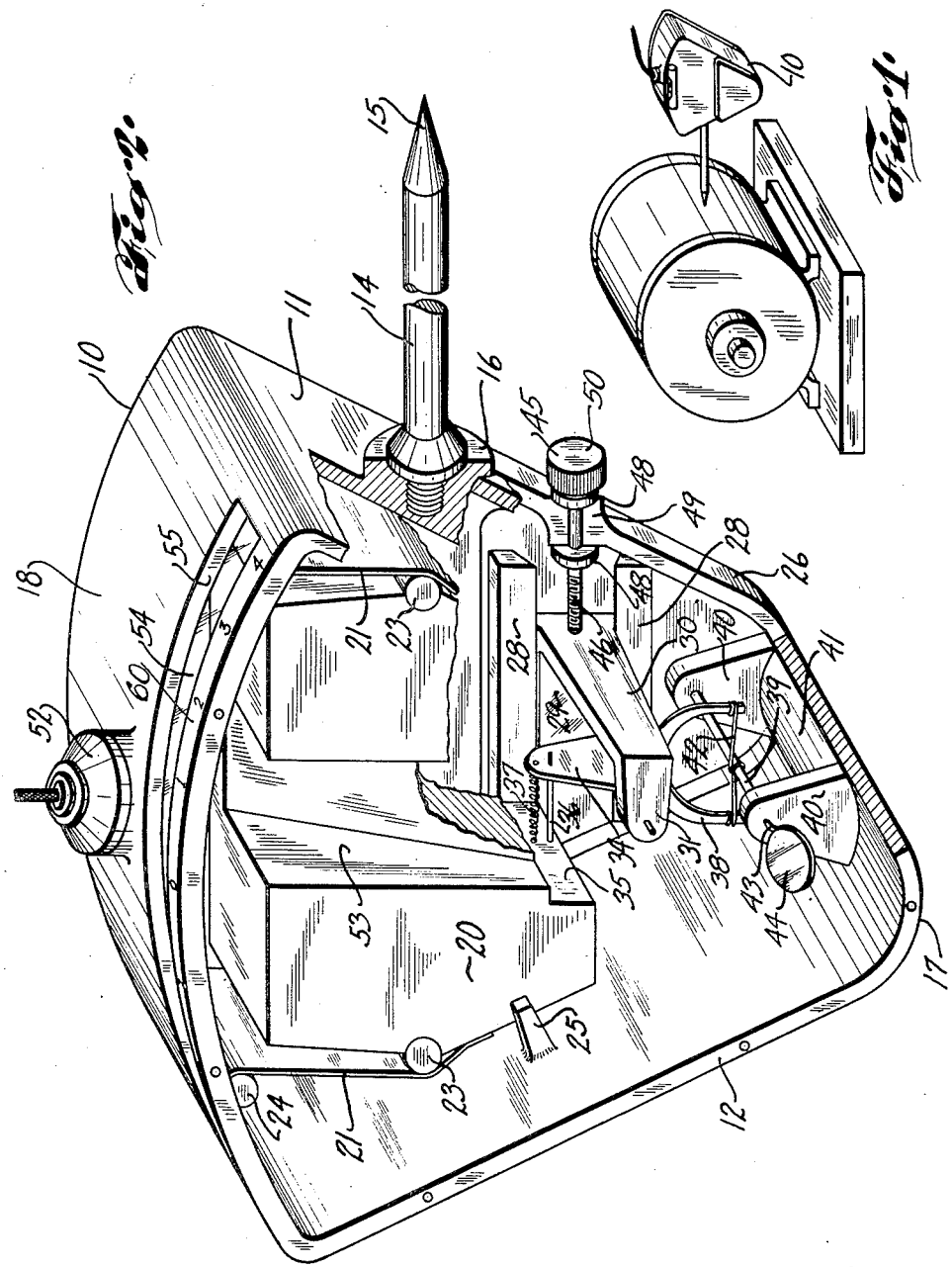
Inventor
EDGAR J. SCHNAITTER
By Roy M. Kiler
Attorney Dec. 8, 1936.  E. J. SCHNAITTER  2,063,127

VIBRATION INDICATOR

Filed April 25, 1932  3 Sheets-Sheet 2

Inventor
EDGAR J. SCHNAITTER
By
Roy M. Kiler
Attorney

Dec. 8, 1936.   E. J. SCHNAITTER   2,063,127
VIBRATION INDICATOR
Filed April 25, 1932   3 Sheets-Sheet 3
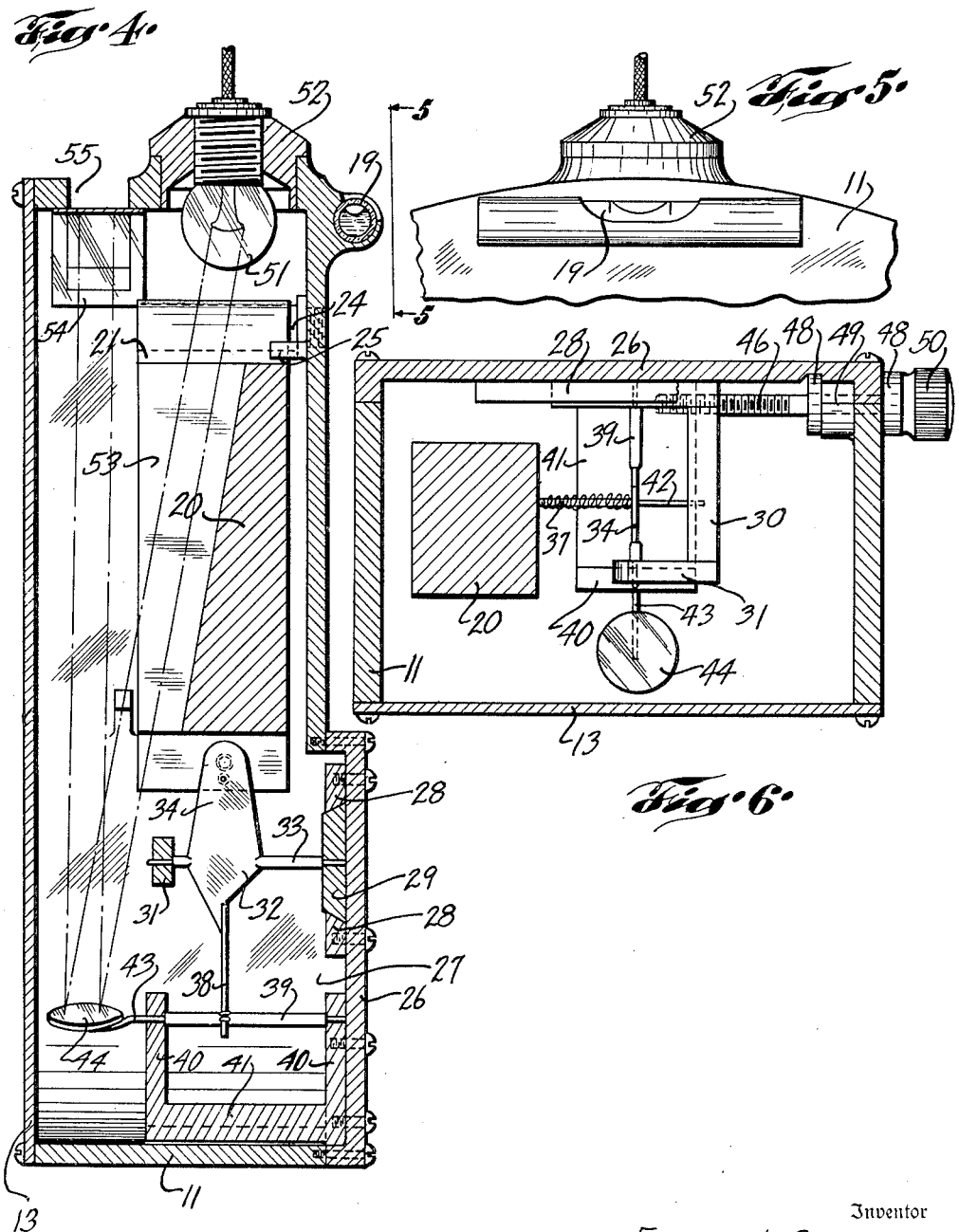
Inventor
EDGAR J. SCHNAITTER
By Roy M Eilers
Attorney Patented Dec. 8, 1936

2,063,127

UNITED STATES PATENT OFFICE 2,063,127

VIBRATION INDICATOR

Edgar Joyce Schnaitter, Beloit, Wis., assignor to Fairbanks, Morse & Co., Chicago, Ill., a corporation of Illinois Application April 25, 1932, Serial No. 607,365

10 Claims. (Cl. 73—51)

This invention relates to improvements in vibration indicators, and more particularly to improvements in instruments employed for detecting and indicating the amplitude of vibrations in the relatively stationary portions of machines of a variety of types.

An object of the present invention is to provide an improved device for testing the amplitude of vibrations in machines, the device being sturdy and rugged in construction, and of minimum size and weight to facilitate ease in transportation from place to place, for test purposes.

A further object is to provide an improved vibration indicator which is neat and compact in construction, and of minimum weight so as to permit it to be readily and easily held in the hands of an operator during the process of testing an object for vibration. By this provision the indicator may be employed under various conditions, and especially in close quarters where it would be impractical to employ indicators of more bulky, less easily handled types.

A still further object is to provide an improved vibration indicator for detecting the vibrations within an object under test, the amplitude of the vibration being visibly indicated by means of a beam of light reflected upon a suitable scale.

Further objects and advantages will appear from the following detailed description of parts of a preferred construction, and from the accompanying drawings, in which:

Fig. 1 is a perspective view of a preferred form of vibration indicator showing its application to a machine, for taking vibration tests; Fig. 2 is an enlarged perspective view, partially in section, of a preferred form of vibration indicating device, certain portions thereof being removed, and others broken away, for better illustration; Fig. 3 is a side elevation of the interior of the device shown in Fig. 2; Fig. 4 is a sectional elevation along line 4—4 of Fig. 3; Fig. 5 is a fragmentary side elevation of a portion of the device as viewed from line 5—5 in Fig. 4; and Fig. 6 is a sectional elevation taken along line 6—6 of Fig. 3.

Referring to the drawings by characters of reference, the numeral 10 designates, generally, a preferred form of vibration indicator which includes, by preference, a frame structure or housing 11 having an open side 12 which is normally closed by means of a detachable cover member 13. It will be readily seen that when the cover 13 is removed (as appears in Fig. 3), the entire mechanism (later described) is supported within the casing 11, and is readily accessible through the side opening for adjustment and repair purposes. A rod or feeler member 14 having an apexed portion 15 is, by preference, detachably secured to a boss portion 16, formed integrally with the case 11. Obviously, the rod member 14 may be formed integrally with the housing, or as above noted, may be detachably secured thereto, so that rods of various length may be employed interchangeably. This rod is, by preference, formed of any suitable metal such that when the rod is positioned in contact with the vibrating object, the vibration will be transmitted directly to the case. The housing 11 is, by preference, pentahedral in form, and is provided with a smoothly rounded lower portion 17, and an upper arcuate face portion 18. The housing is, by preference, formed in the manner described, to facilitate holding and manipulation of the device. In addition, the casing 11 and cover member 13 are, by preference, formed of a suitable light-weight alloy, such as aluminum, so that the device may be readily supported in the hands of an operator. A spirit level 19, which may be of conventional form is, by preference, disposed in lateral adjacence to the arcuate wall portion 18 of the case, the level being supported in a frame which may be cast integrally with the housing 11. When employing the indicator 10 for test purposes, the indicator is held in the hand of an operator in a horizontal position as indicated by the spirit level 19 on the side of the case, the apexed portion 15 of the feeler member 14 is then firmly pressed against the vibrating object, for example as shown in Fig. 1. In this position, the vibrations of the object are transmitted through the feeler member 14 to cause a corresponding vibration of the entire frame structure.

Within the housing 11, there is disposed an inertia member 20 of appreciable weight, which is shown as suspended, in a vertical position, by means of a plurality of thin, flat, flexible metallic strips 21, which are securely attached, as by welding or brazing, to opposite face portions of the weight 20, the outer ends of the strips being securely attached by means of pins 22 to the inner portion of the wall 18 of the case. These strips are, by preference, formed of brass or some other similar flexible metal which, due to its inherent flexibility, will tend to minimize the transmission of vibrations to the weight, from the housing. Portions of the strips 21 are spaced, respectively, from the weight by means of cylindrical members 23, secured to opposite face portions of the weight, and near the point of attachment of the strips to the weight. The strips are thence extended upwardly toward the wall 18, so that the strips, respectively, contact with pins 24 which are secured to the housing 11, substantially close to the fastenings 22. It will be seen that when the housing 11 is held in a horizontal position as indicated by the spirit level 19, the weight member 20 will be suspended in a vertical position, within and free from contact with the walls of the housing 11. A plurality of lugs 25 are, by preference, cast integrally with, and extend inwardly of the case 11, and are suitably arranged about and spaced from the lateral and upper faces of the weight member, so as to limit any appreciable forward and upward movement of the weight, without interfering with its normal suspended position, or freedom of intended movement of the case with respect thereto. By this arrangement the indicator may be tilted in any position without fear of damaging any mechanism supported within the case. It will be readily seen that the weight 20 occupies substantially the greater part of the upper interior portion of the casing, and that its movements are confined to this limited space by reason of the lugs 25 and by reason of the abutment of strips 21 with the side walls of the housing in case of excessive relative movement of the weight and housing to the right or left as viewed in Fig. 3. The space immediately below the weight member serves to contain mechanism hereinafter described.

This mechanism is removably supported within the housing by means of a plate 26 which serves as a closure for an opening 27 provided in the housing 11. This plate serves detachably to support a pair of relatively spaced inwardly beveled guide members 28, the beveled edges of which snugly engage opposite, similarly beveled faces of a supporting structure 29, including an arm portion 30 which projects inwardly of the case, and substantially at a right angle to the plate 26, an inner extremity 31 of the arm being bent inwardly to lie in a plane parallel to, and spaced from a plane containing the plate 26. A lever 32 is, by preference, pivotally mounted intermediate its ends by means of a pin 33 journalled on or in the extremity 31, and the base portion of the supporting structure 29. This pin is, by preference, made an integral part of the lever, which further includes an upwardly extending plane arm portion 34 disposed in a plane including the pin 33, and which is substantially perpendicular to the plane containing the plate 26. The outer end of the arm 34 of the lever 32 extends into a slotted portion 35 of the weight 20, the arm being loosely connected to the weight by means of a shouldered pin 36, and positioned adjacent the shoulder by means of a spring 37 attached at its ends to the weight and to the arm. As will hereinafter appear, the pin 36 serves as a pivot about which the lever oscillates, this point being more or less stationary, due to the fact that it is urged into engagement with the inertia member 20 by spring 37. The opposite end of the lever 32 is, by preference, provided with a forked arm portion 38 which is shown as arranged to lie in a plane containing the pin 36, the arms of the fork or wishbone being spaced from each other, on opposite sides of a pin 39, which is supported in upright legs 40 formed integrally with a supporting member 41, detachably secured to the plate 26, as by screws (Fig. 4). These arm portions of the forked lever are connected by means of a cord 42 which is wound intermediate its ends about the pin 39, so that oscillations of the lever 32 will be translated into a rotary movement of the pin 39 by means of the corded connection between the lever ends and the pin, the pin being provided with an overhung portion 43 for supporting a mirror 44. This mirror is, by preference, provided with a ground plane reflector surface portion for a purpose hereinafter appearing. The cord 42 is, by preference, formed of a suitable fibrous material, such as silk thread, or any other material which possesses good vibration-damping characteristics and which, at the same time, resists bending fatigue.

It will be readily understood that with the instrument in use, the vibrations of the object under test will be transmitted to the case 11, thence to the pin 33 through the supporting structure 29, which is adjustably secured to the case and guideways 28, by means of a manually adjustable device 45. This device includes a threaded member 46 which engages a threaded bore 47 formed in the arm portion 30 of the support 29. Endwise movement of the threaded member 46 is prevented by means of a pair of collars 48 formed, by preference, integrally with the member 46, the collars being spaced from each other and arranged to engage, respectively, the inner and outer faces of split bosses 49, formed on the case 11 and plate 26. The screw member 46 projects through and beyond the case, a knurled knob or thumb screw 50 being securely attached to the outer extremity of the member 46 for manual control of the adjusting device 45. Rotary movement of the knob 50 produces endwise movement of the supporting structure 29 for varying the position of the pin 33 for a purpose hereinafter appearing.

In operation the indicator 10 is held, in the hands of an operator, in a horizontal position, as indicated by the air bubble in the spirit level 19, and the apexed portion of the feeler member 14 is firmly pressed against the vibrating object under test. In this position, the vibrations of the object are transmitted to the case 11 and the supporting structure 29 which, due to the moment of inertia of member 20, produces a limited oscillating movement of the reflector 44, which reflects a beam of light issuing from an electric lamp 51 mounted within a receptacle 52, which is suitably insulated from the wall 18 of the case. The lamp 51 may be energized from any suitable source of power (not shown) such as a dry cell, flash light cell or small transformer. The beam of light issuing from the lamp is directed through a slotted portion 53 provided in the weight member 20. The beam is thence reflected as a narrow line of light by the mirror 44, upon a transparent strip or window 54, which is securely attached to the inner portion of the wall 18 and serves to close a narrow aperture 55 which is disposed longitudinally of the case. The transparent window strip 54 is, by preference, provided with suitable graduated indicia (not shown), forming a scale, the zero mark of the scale being disposed substantially midway between the end portions of the aperture 55, and arranged to lie substantially in a plane which contains the center of the lamp 51 and the reflector pivot pin 39, which is disposed by preference equidistant from all portions of the transparent scale 54. The indicia on the strip 54 may be employed in conjunction with a suitable scale 60 on the upper surface of the case. For adjusting purposes, the indicator is held in a horizontal position, and the supporting structure 29 adjusted by means of the manual adjusting screw 50, until the beam of light reflected by the mirror intersects the zero mark on the scale 54. This adjustment may be accomplished by manually rotating the knob 50, which, in turn, causes movement of the lever 32 about its pivot pin 36, to rotate the reflector sufficiently to bring the beam of light to the zero mark on the scale. With this adjustment completed the instrument is ready for use in testing the extent of vibrations present in a machine.

It will be readily understood that the weight member 20 is formed of sufficient mass to act as a relatively rigid or stationary support for the pivot end of the lever 32, and that the entire case and lever oscillate about this point, and therefore the period of oscillation of the pivot pin 33 is substantially equal to the period of oscillation or vibration present in the machine under test. Since the vibrations transmitted from the machine under test to the indicator 10 are, in most cases, of high frequency, the reflector 44 will likewise, be oscillated proportionally thereto, to produce a reflected light band upon the scale 54 for indicating, visibly, the amplitude of the transmitted vibration. The extent of the vibration is measured on a scale selected according to the class of machines under test, it having been found in practice that a scale reading in half thousandths of an inch, is suitable for testing small size electric machines.

In the present, preferred example, the inner wall portions of the case and the mechanism carried therein, with the exception of the reflector 44 and the transparent scale 54 are, by preference, coated with a suitable non-reflecting light-absorbent substance, such as a dull black paint or the equivalent. By this provision the image of the lamp filament is directed to the reflector and thence in turn, to the scale, without any interfering reflections within the case.

It will be seen that the indicator as described is extremely light in weight, neat and compact in construction, so as to facilitate portability. The particular shape of the indicator makes for ease in handling in close quarters, where older prevailing types of vibration indicators could not be employed because of space restrictions. It will be understood that the principle of operation is simple, in that the instrument indicates the relative movement between a vibrating object and a suspended weight, which acts as a solid foundation, and thereby eliminates the necessity of placing the instrument upon a solid foundation, as is usual in older prevailing types of vibration-testing equipment.

It will, of course, be understood that the present detailed description of parts, and the accompanying drawings relate to only a single preferred executional embodiment of the invention, and that substantial changes may be made in the described arrangement and construction of parts, without departing from the spirit and full intended scope of the invention.

I claim:

1. In a vibration indicator, a casing arranged to be subjected to vibration by a machine under test, an inertia element carried by said casing, a pair of spaced ribbon elements constituting a vibration-damping cradle structure supporting the inertia element in depending relation within the casing, a projection on the inertia element, a lever rockably secured at one end, to said projection, a lever pivot, intermediate the ends of the lever, adjustably connected to the casing, a pair of jaws at the opposite end of the lever, an indicating member pivotally supported to extend between said jaws, and a thread-like element secured across the jaws, and wound on the indicating member.

2. In a vibration indicator, a casing adapted to engage a vibrating element under test, a weight suspended in said casing, a lever, means connecting one end of the lever to said weight, a lever pivot slidably carried by the casing, means operable externally of the casing for adjusting the position of the pivot, jaws near the other end of the lever, an indicator pivot carried by the casing and extending between said jaws, a thread bridging the jaws and wrapped about the indicator pivot, and means for indicating the range of angular movement of said indicator pivot.

3. In a vibration indicator, a case, a weight within the upper portion of said case, a pair of resilient metal straps laterally secured to the weight, and to the upper wall of the case, a feeler secured to said case, and adapted to engage a vibrating element under test, a lever and a connection from one end thereof to said weight, a fork at the opposite end of the lever, a thread connecting the arms of the fork, a pivot carried by the case, and frictionally engaged by the thread, a reflector carried by said pivot, a source of illumination within said case, arranged to be directed upon said reflector, and a scale for receiving a beam of light from said reflector.

4. In a vibration indicator, a housing, a weight, means carried by said housing for limiting the movement of the weight with respect to said housing, a pair of resilient, vibration-absorbing metallic strap elements by and between which said weight is supported in depending relation from an upper wall of the housing, in a horizontal position and a spacer element carried between each strap element and the adjacent face of the weight.

5. In a vibration indicator, a housing having a detachable closure portion, a weight suspended within the housing, a pair of guide ways on said closure portion, a supporting arm held between said guide ways, a forked lever pivotally carried by said supporting arm, means connecting said forked lever to the weight, and means associated with the housing for horizontally adjusting said supporting arm.

6. In a vibration indicator, a housing, an indicator pivot, a lever, a pivot through an intermediate portion of the lever, an adjustable bracket for said second named pivot, a screw accessible externally of the housing for adjusting said bracket within the housing, an inertia element, vibration-absorbing straps suspending said inertia element from a wall of the housing, means connecting said element to one end of said lever, means for imparting vibration from a machine under test, through said housing, bracket and second named pivot to the intermediate portion of said lever, spaced arms at the opposite end of the lever, and a thread-like element connecting the arms of said lever, and wrapped about said indicator pivot.

7. In a vibration indicator, a housing, a pivoted indicator member, a lever having spaced jaws on one of its ends, and extending on opposite sides of said member, a pivot for said lever, adjustably secured in the housing and spaced from said jaws, an inertia element removably connected to said lever near the end opposite said jaws, resilient strap elements suspending said inertia element within the housing, the strap elements extending from points of anchorage above the inertia element, thence downwardly along and adapted to abut opposite sides of the housing, the strap elements further being located to engage opposite faces of the inertia element to restrict the relative displacement of the inertia element and housing, means for imparting vibration through the housing, to the pivot for said lever, from a machine under test, and a filament connecting said jaws, and arranged in frictional actuating relation to said pivoted indicator member.

8. In a vibration indicator, an indicator pivot member, a lever having a bifurcated end portion with its furcations disposed in spaced relation on opposite sides of said pivot member, a slidably adjustable support for said lever, an inertia element connected to said lever, at a point remote from the bifurcated end thereof, means for transmitting vibrations from a machine under test, to said lever, at a point spaced from its connection to the inertia element, and to the indicator pivot member, and a flexible element extending from one furcation of said lever, into frictional actuating relation with said pivot member, thence connected to the other furcation.

9. In a vibration indicator, a housing having a detachable closure, a weight suspended within the housing, a feeler on said housing, adapted to engage a vibrating element under test, a plurality of supports slidably mounted on said closure, means operable externally of the housing for adjusting the position of said supports, a lever system carried by said supports, means including a spring element connecting one end of the lever system with said weight, a pair of spaced jaws at the other end of the lever system, a pivot between said jaws, a tension element connecting the jaws and wrapped about the pivot, a reflector operatively associated with said pivot and adapted for oscillating movement therewith as the housing is subjected to vibration, a source of illumination within said housing, arranged to be directed upon said reflector, and a scale carried by the housing, and visible externally thereof, for receiving a beam of light from said reflector for visibly indicating the amplitude of vibration of said light beam, as determined by the amplitude of the vibration impulses received by the housing through said feeler.

10. In a vibration indicator, a housing having a detachable closure portion, a weight suspended within the housing, guides on said closure portion, a supporting arm detachably carried by said guides, a forked lever pivotally carried by said supporting arm, means connecting said forked lever to the weight, an indicator pivot, means for translating relative movement of said forked lever and said pivot, to an oscillating movement of the pivot, a bracket for supporting the indicator pivot, the bracket being detachably secured to said closure portion, and means for adjusting said supporting arm relative to the housing.

EDGAR JOYCE SCHNAITTER.